March 1, 1932. W. L. MINGLEDORFF 1,847,971
BARK PEELING MACHINE
Filed July 10 1929 3 Sheets-Sheet 1

INVENTOR.
Walter L. Mingledorff,
BY
Geo. P. Kimmel
ATTORNEY.

March 1, 1932. W. L. MINGLEDORFF 1,847,971
BARK PEELING MACHINE
Filed July 10, 1929   3 Sheets-Sheet 2

INVENTOR.
Walter L. Mingledorff,
BY
Geo. P. Kimmel
ATTORNEY.

March 1, 1932. W. L. MINGLEDORFF 1,847,971
BARK PEELING MACHINE
Filed July 10, 1929   3 Sheets-Sheet 3
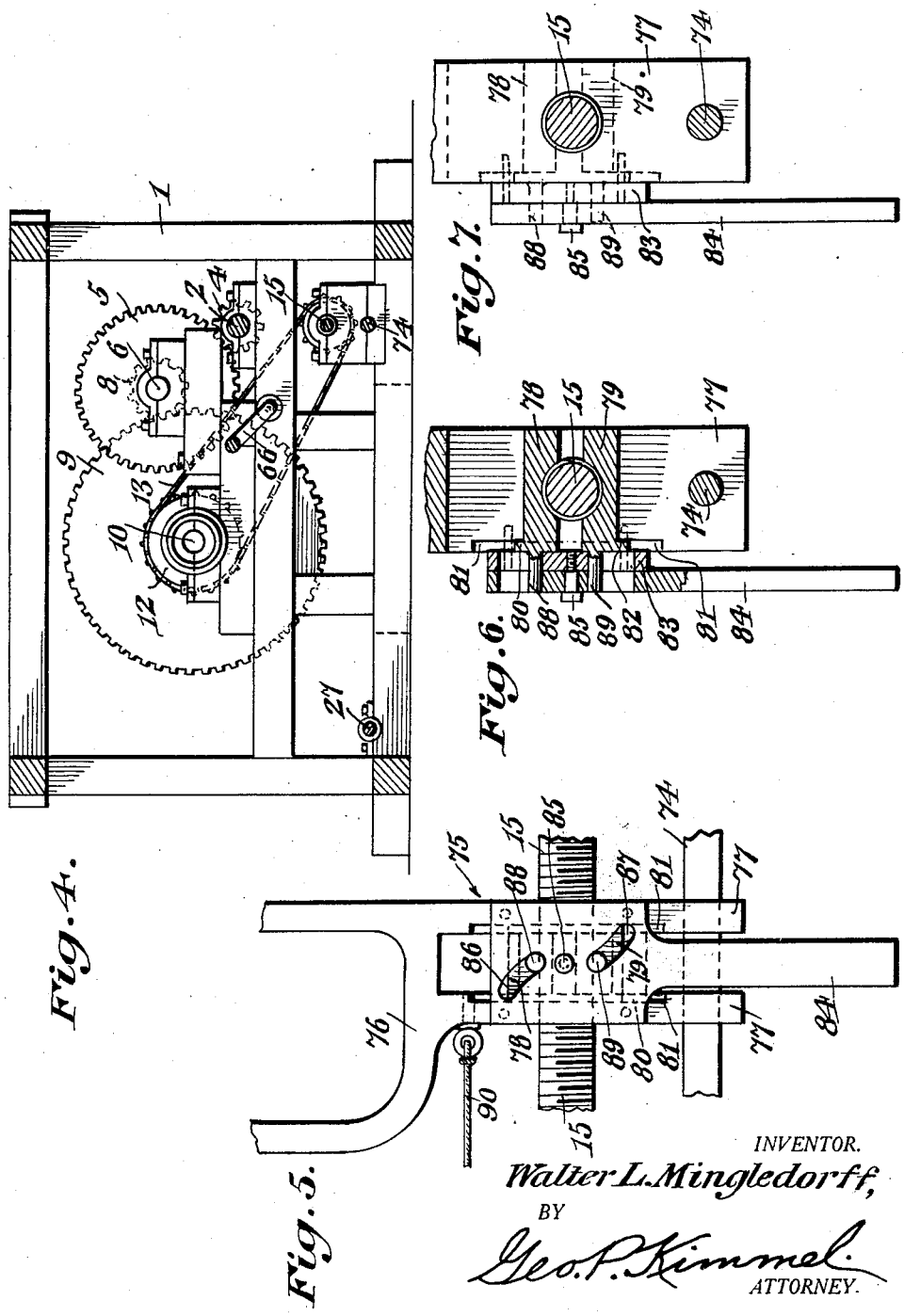
INVENTOR.
Walter L. Mingledorff,
BY
Geo. P. Kimmel
ATTORNEY.

Patented Mar. 1, 1932

1,847,971

UNITED STATES PATENT OFFICE

WALTER LEE MINGLEDORFF, OF SAVANNAH, GEORGIA

BARK PEELING MACHINE

Application filed July 10, 1929. Serial No. 377,193.

This invention relates to a machine for peeling bark from logs and has for its primary object to provide, in a manner as hereinafter set forth, a machine of such class which is capable of automatically adjusting itself to the periphery of a log having a varying diameter and which may be effectively used in connection with either straight or crooked logs.

A further object of the invention is to provide a machine of the class aforesaid, including as a part thereof a cutter element for engagement with the periphery of a log, spirally of the latter.

With the foregoing and other objects in view, the invention consists of the novel construction, combination and arrangement of parts as hereinafter more particularly described, and as illustrated in the accompanying drawings wherein is shown an embodiment of the invention, but it is to be understood that the description and drawings are to be taken as illustrative, and that the invention is intended to be limited only by the scope of the claims hereunto appended.

In the accompanying drawings in which like numerals are employed to designate like parts throughout the same:

Figure 4 is a vertical, transverse section therethrough taken at a point indicated by the line 4—4 of Figure 2.

Figure 5 is an enlarged, fragmentary, elevation of the carriage for the cutter mechanism.

Figure 6 is a fragmentary, vertical section through the carriage.

Figure 7 is an elevation of the carriage taken at a right angle to Figure 5.

Figure 8 is a fragmentary section of the cutter arm, showing the mounting thereof with respect to the operating shaft.

Figure 9 is a fragmentary sectional plan of the cutter arm and cutter carried thereby.

Figure 1:
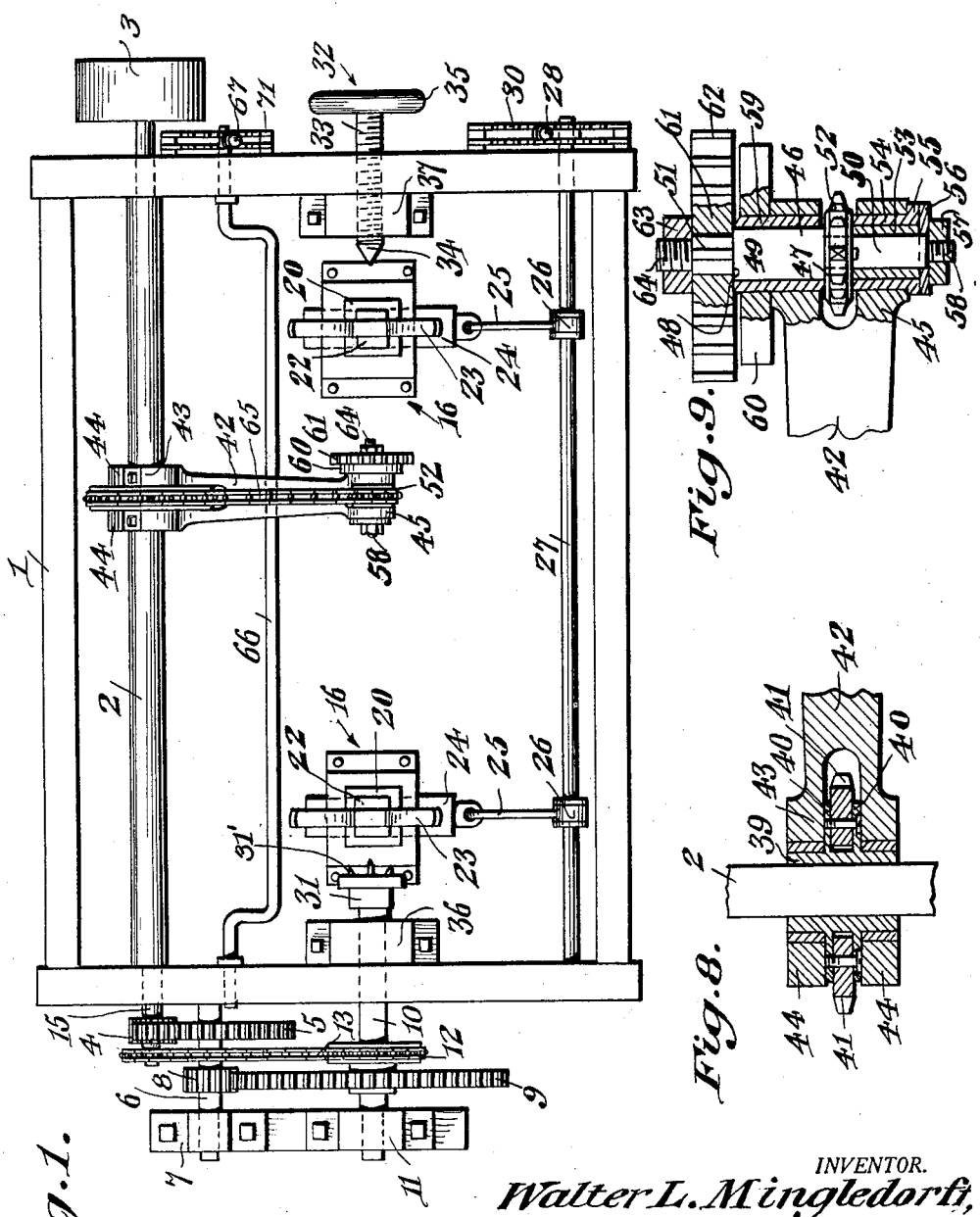
Figure 1 is a top plan of a machine in accordance with this invention.
Figure 2:
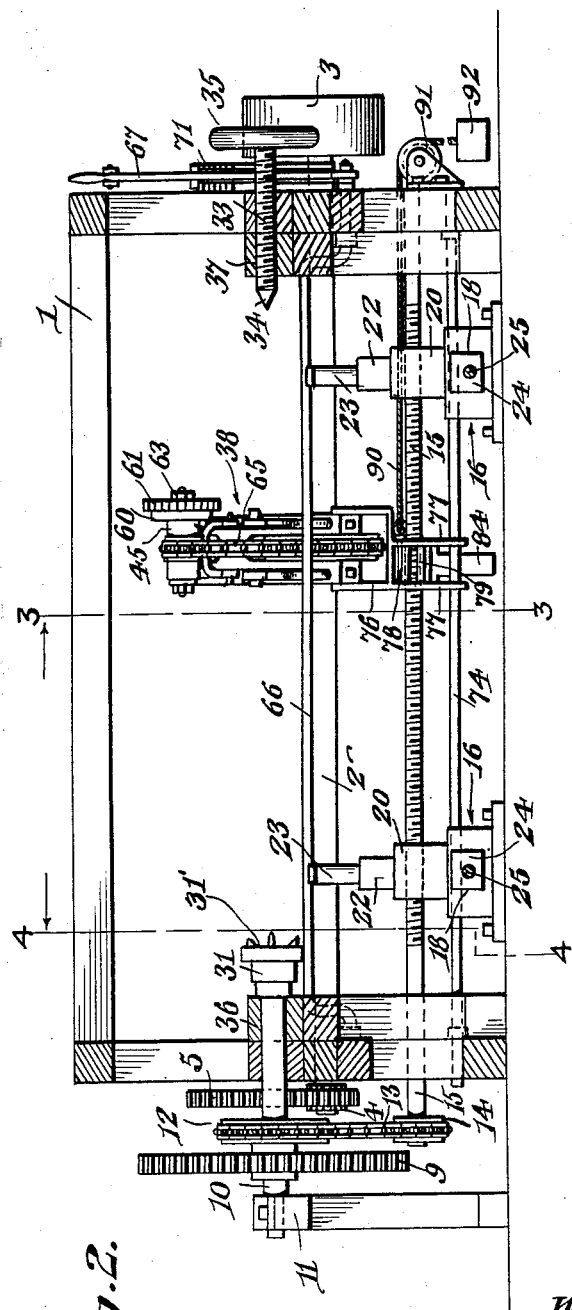
Figure 2 is a vertical, longitudinal section therethrough.
Figure 3:
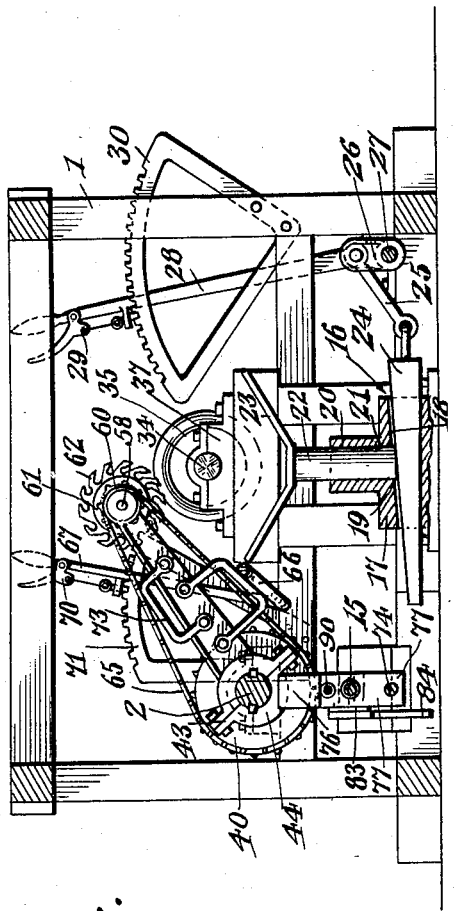
Figure 3 is a vertical, transverse section therethrough taken at a point indicated by the line 3—3 of Figure 2.

Referring to the drawings in detail, the numeral 1 indicates a frame which is preferably of skeleton construction, as shown. Rotatably supported by the frame and extending longitudinally thereof is an operating shaft 2 upon one end of which is fixedly secured a drive pulley 3. Fixedly secured to the opposite end of the operating shaft 2 is a pinion 4 which is in mesh with a gear 5 fixedly mounted on a stub-shaft 6, the respective ends of which are journaled in the frame 1 and a bearing 7 suitably supported in spaced relation to the frame. Fixedly secured to the stub-shaft 6 is a pinion 8 which is in mesh with a gear 9 fixedly mounted on a shaft 10 rotatably supported by the frame 1 and a bearing 11 suitably supported in spaced relation to the frame. Fixedly mounted on the shaft 10 is a sprocket 12 which is operatively connected by means of a chain 13 with a sprocket 14 fixedly mounted on an externally threaded shaft 15 which is suitably journaled in the frame 1 and extends longitudinally thereof in parallel relation to the operating shaft 2.

Disposed within the frame, in alignment with respect to the length thereof, is a pair of log supporting and adjusting members 16. The members 16 are arranged in spaced relation, one adjacent each end of the frame, and each includes an elongated base 17 disposed transversely of the frame and formed with a slot 18 extending longitudinally therethrough and provided with an inclined upper wall 19. Seated on the base 17, centrally thereof, is a hollow member 20, the inner wall of which is in registry with the wall of an opening 21 formed through the top of the base 17 and communicating with the slot 18. Slidably extending through the hollow member 20 is a post 22, upon the upper end of which is mounted a substantially V-shaped head 23. The lower end of the post 22 is adapted to project into the slot 18 and is preferably formed with an inclined face corresponding to the upper wall of the slot 18. Adapted to slidably extend through the slot 18 is a wedge 24, the upper wall of which is inclined to correspond to the upper wall of the slot 18. The wedge 24 for each of the members 16 is pivotally connected with a link 25, which is also pivotally connected to a crank 26 fixedly secured to a rod 27 rotatably supported by the frame 1 and extending longitudinally thereof. The rod 27 is provided with an operating lever 28 having a suitable latching mechanism 29 for engagement with a rack 30 carried by the frame 1, adjacent one end of the latter.

Fixedly secured to the inner end of the shaft 10 is a log centering element 31, the inner face of which is formed with a plurality of spurs 31' for engaging one end of a log, not shown. The element 31 is located adjacent one of the members 16 and is disposed in alignment, longitudinally of the machine, with the vertical planes of the members 16. Extending through the frame 1, at the opposite end thereof from the element 31, is a log engaging element 32 which consists of a threaded shank 33 formed with a pointed inner end 34 and provided at its outer end with a hand wheel 35. Supports 36 and 37 respectively are provided for the shaft 10 and shank 33, such supports being located adjacent the inner faces of the ends of the frame 1.

The element 32 is in alignment with the element 31 and with the vertical planes of the members 16, longitudinally of the machine. Mounted on the operating shaft 2 is a cutter mechanism indicated generally by the numeral 38 and including a sprocket sleeve 39 suitably keyed to the shaft 2 to rotate therewith and to provide for longitudinal movement with respect thereto. The sleeve 39 is provided with a pair of spaced, circumferentially extending flanges 40, between which are secured a plurality of teeth 41. The teeth 41 are arranged in spaced relation and project a substantial distance from the peripheral faces of the flanges 40. Carried by the sleeve 39 is a cutter arm 42, one end of which is provided with a bifurcated bearing 43 which is rotatably mounted on the sleeve 39 by means of a pair of bearing caps 44. The bearing caps 44 are disposed on opposite sides of the flanges 40 and the latter extend within the bifurcated end of the arm 42.

The opposite end of the arm 42 is formed with a bifurcated, horizontally apertured head 45 through which a horizontally disposed spindle 46 extends. The spindle 46 is formed with a pair of spaced shoulders 47 and 48 whereby a portion 49 of the spindle is provided with a greater diameter than the adjacent portions 50 and 51. Mounted on the portion 50 to rotate therewith is a sprocket 52 which is disposed within the bifurcated head 45 and one side face of which abuts the shoulder 47. The portion 50 is provided with a tubular bearing 53 and encircling such bearing is a sleeve 54, the outer end of which is formed with an outwardly directed, circumferentially extending flange 55 which bears against an end face of the head 45. The bearing 53 and sleeve 54 are maintained in position by means of a suitable washer 56 and nut 57 which is threaded on a reduced threaded end 58 of the portion 50.

The portion 49 is provided with a tubular bearing 59, the inner end of which is flush with the shoulder 47 and the outer end of which is flush with the shoulder 48. The portion 49 and bearing 59 extend a substantial distance beyond an outer end face of the head 45 and rotatably mounted on the projecting end portion of the bearing 59 is a gauge roller 60. Mounted on the portion 51 to rotate therewith is a cutter element 61 which is substantially disc-shaped and provided at its periphery with a plurality of arcuate teeth 62. The inner face of the cutter element 61 abuts the shoulder 48 and is maintained in position by means of a nut 63 which is threaded on a reduced threaded end 64 of the portion 51. An endless chain 65 is carried by the sprocket sleeve 39 and sprocket 52 to provide for the rotation of the spindle 46.

The cutter mechanism 38 may be adjusted with respect to a log secured between the log engaging elements 31 and 32 by means of a crank 66 which extends longitudinally of the machine and which is suitably journaled in the ends of the frame 1. Carried by one end of the crank 66 is an operating lever 67 which is provided with a latch mechanism 70 for engagement with a rack 71 secured to the frame 1, at one end of the latter. Depending from the arm 42 is a U-shaped bar 72 which projects beneath the chain 65 for engagement with the crank 66. Secured to the arm 42 and projecting from the upper face thereof is a substantially U-shaped bar 73 which provides a hand grip for the cutter mechanism.

Extending longitudinally of the machine, in parallel relation to the threaded shaft 15, is a rod 74, upon which is slidably mounted a carriage for the cutter mechanism. The carriage is indicated generally by the numeral 75 and includes a substantially U-shaped frame 76 for the reception therein of the bearing caps 44. Depending from the frame 76 is a pair of spaced supporting members 77 through which the rod 74 and threaded shaft 15 extend. Mounted between the supports 77, on opposite sides of the shaft 15, is a pair of nut sections 78 and 79. The upper section 78 is formed at one end with a flange 80 which extends continuously around the top and sides of the section with that portion which extends from the sides being disposed within grooves 81 formed in the inner faces of the supports 77 at one edge face of the latter. The lower section 79 is formed at one end with a flange 82 which extends continuously around the sides and bottom of the section with the portions projecting from the sides disposed within the grooves 81. The opposed faces of the sections 78 and 79 are grooved and threaded for engagement with the threads on the shaft 15. The sections 78 and 79 are maintained in position between the supports 77 by means of a block 83 secured to the edge faces of the supports 77 and extending across the ends of the sections at which the flanges 80 and 82 are formed.

Carried by the block 83 is a handle member 84, the upper end of which conforms in contour to the block 83 and is pivotally secured thereto by means of a pivot pin 85 which is disposed in horizontal alignment with the shaft 15. Extending through the block 83 and the upper portion of the handle member 84 is a pair of inclined slots 86 and 87, respectively disposed above and below the pivot pin 85. A pin 88 is formed on the flanged end of the upper section 78 and projects through the slot 86. A similar pin 89 is formed on the flanged end of the lower section 79 and projects through the slot 87.

With the handle member 84 disposed vertically, the pins 88 and 89 are positioned at the inner ends of the slots 86 and 87 and upon swinging the handle member 84 about its pivot, the pins 88 and 89 are caused to ride along the walls of the slots 86 and 87 whereby the sections 78 and 79 are moved away from each other. When the pins 88 and 89 are disposed at the inner ends of the slots 86 and 87, the threads of the sections are in engagement with the threads of the shaft 15.

Secured to the carriage 75 is a cable 90 which passes over a pulley 91 mounted at one end of the frame 1 and to the outer end of which is secured a suitable weight 92.

In the operation of my improved bark peeling machine, a log of suitable length is positioned on the V-shaped head 23 of the supporting and adjusting members 16 and by manipulation of the operating lever 28, the ends of the log are brought into alignment with the log engaging elements 31 and 32. The element 32 is then tightened to engage one end of the log and force the other end thereof into engagement with the spurred face of the element 31 after which the heads 23 of the adjusting members 16 are withdrawn from engagement with the log by manipulation of the lever 28. The operating shaft 2 is then rotated by the application of any suitable power to the pulley 3 which causes the log to be rotated by the shaft 10 and element 31 carried thereby and also causes the cutter element 61 to be rotated in the same direction as the log. The teeth 62 of the cutter element 61 rest on the peripheral surface of the log and due to the loose mounting of the arm 42 on the sprocket sleeve 39, the arm is free to oscillate in order that the teeth 62 of the cutter element may be constantly maintained in contact with the rotating peripheral surface of the log.

The depth of cut of the cutter element is regulated by the gauge roller 60, the radius of which, plus the depth of cut desired, should be equal to the radius of the cutter element 61. Simultaneously with the rotation of the log and cutter element, the threaded shaft 15 is rotated which causes the carriage 75 to move longitudinally of the shaft 15, thereby moving the cutter mechanism 38 longitudinally of the operating shaft 2. When the cutter mechanism 38 has travelled the length of the log, the same may be returned to the starting end of the machine by swinging the handle member 84 about its pivot to disengage the nut sections 78 and 79 from the shaft 15, thereby permitting the carriage 75 to freely slide along the rod 74.

It is thought that the many advantages of a bark peeling machine in accordance with this invention will be readily apparent, and although the preferred embodiment of the invention is as illustrated and described, yet it is to be understood that various changes in the size, shape and arrangement of parts may be resorted to, so long as such changes fall within the scope of the invention as defined in the appended claims.

What I claim is:—

1. In a bark peeling machine, a supporting arm rotatably mounted at one end and having a bifurcated head at its other end, said head having an opening extending therethrough transversely of the arm, a sleeve extending through the portion of the head at one side of the bifurcation therein and having a flange abutting the outer face of said portion, a tubular bearing extending through the portion of the head at the opposite side of the bifurcation therein and projecting materially from the outer face of the last mentioned portion, a tubular bearing extending through said sleeve, a spindle extending through said tubular bearings and projecting therefrom at opposite sides of said head, said spindle having a pair of shoulders flush with the ends of the first named tubular bearing, a cutting element non-rotatably mounted on said spindle, a nut threaded on one end of the spindle for maintaining the cutting element in abutment with one of said shoulders, a sprocket non-rotatably mounted on the spindle adjacent the other of said shoulders, a washer adjacent the opposite end of the spindle, and a nut threaded on the opposite end of the spindle for maintaining the sprocket in abutment with the shoulder adjacent thereto.

2. In a bark peeling machine, a rotatable operating shaft, a sleeve slidably and non-rotatably mounted on the shaft, a sprocket formed on the sleeve, an arm rotatably mounted at one end on the sleeve and having its opposite end bifurcated, a rotatable spindle carried by said opposite end and extending across the bifurcation therein, said spindle having a central portion of greater diameter than the end portions thereof, a cutter element mounted on one of said end portions to rotate therewith, a sprocket mounted on the other of said end portions to rotate therewith and disposed in said bifurcation, an endless chain extending around said sprockets, a substantially U-shaped bar secured to said arm and depending below said chain, and a crank extending beneath said bar transversely thereof for adjusting said arm with respect to the rotatable mounting therefor.

In testimony whereof, I affix my signature hereto.

WALTER LEE MINGLEDORFF.